(12) United States Patent
Yomogita et al.

(10) Patent No.: US 8,070,334 B2
(45) Date of Patent: Dec. 6, 2011

(54) WORKING MACHINE

(75) Inventors: Makoto Yomogita, Hirakata (JP);
Masamichi Miyazaki, Hirakata (JP);
Keita Muto, Kyotanabe (JP); Koji Nagami, Hirakata (JP)

(73) Assignee: Komatsu Ltd., Tokyo (JP)

( * ) Notice: Subject to any disclaimer, the term of this patent is extended or adjusted under 35 U.S.C. 154(b) by 76 days.

(21) Appl. No.: 12/095,932

(22) PCT Filed: Jan. 10, 2007

(86) PCT No.: PCT/JP2007/050185
§ 371 (c)(1),
(2), (4) Date: Jun. 3, 2008

(87) PCT Pub. No.: WO2007/099720
PCT Pub. Date: Sep. 7, 2007

(65) Prior Publication Data
US 2009/0244920 A1 Oct. 1, 2009

(30) Foreign Application Priority Data
Feb. 28, 2006 (JP) ................. 2006-053397

(51) Int. Cl.
*B60Q 1/32* (2006.01)
(52) U.S. Cl. ........ 362/507; 362/512; 362/531; 362/532; 362/485; 362/493

(58) Field of Classification Search .................. 362/507, 362/512, 485, 493, 531, 532; 248/138, 227.2, 248/278.1, 352
See application file for complete search history.

(56) References Cited

U.S. PATENT DOCUMENTS

| | | | | | |
|---|---|---|---|---|---|
| 4,192,427 | A | * | 3/1980 | Bergman | 212/271 |
| 4,722,030 | A | * | 1/1988 | Bowden | 362/493 |
| 5,258,893 | A | * | 11/1993 | Finneyfrock | 362/485 |
| 5,310,974 | A | * | 5/1994 | Churchill et al. | 200/566 |
| 5,413,188 | A | | 5/1995 | Ui | |
| 5,426,571 | A | * | 6/1995 | Jones | 362/466 |
| 7,303,320 | B1 | * | 12/2007 | Ashley | 362/493 |
| 7,431,485 | B1 | * | 10/2008 | Saward et al. | 362/493 |

FOREIGN PATENT DOCUMENTS

| | | |
|---|---|---|
| JP | 04-125939 U | 11/1992 |
| JP | 11-091372 A | 4/1999 |
| JP | 2000-344008 A | 12/2000 |

* cited by examiner

*Primary Examiner* — Jong-Suk (James) Lee
*Assistant Examiner* — Mark Tsidulko
(74) *Attorney, Agent, or Firm* — Global IP Counselors

(57) ABSTRACT

The work machine has an operator's cab, an engine hood, an exhaust pipe, a first headlight, and a second headlight. The engine hood is disposed in front of the operator's cab. The exhaust pipe projects upwards from the engine hood. The first headlight and the second headlight are provided at a front part of the operator's cab spaced in a lateral direction and disposed so that optical axes of the first and second headlights are mutually intersect but not to overlap with the exhaust pipe when viewed in a top plan view.

9 Claims, 6 Drawing Sheets

WORKING MACHINE

CROSS-REFERENCE TO RELATED APPLICATIONS

This U.S. National stage application claims priority under 35 U.S.C. §119(a) to Japanese Patent Application No. 2006-053397, filed in Japan on Feb. 28, 2006. The entire disclosures of Japanese Patent Application No. 2006-053397 are hereby incorporated herein by reference.

TECHNICAL FIELD

The present invention relates to a work machine.

BACKGROUND ART

Work machines such as crawler dozers are provided with an engine hood to the front of an operator's cab. An exhaust pipe then projects upwards from the engine hood (refer to Japanese Laid-Open Patent Publication No. 2000-344008 (paragraph [0005], FIG. 1)). Work machines where headlights illuminating to the front are provided at the front left and right corners of the engine hood and where the headlights are provided at the front surface of a canopy roof at an upper part of the operator's cab also exist.

SUMMARY OF THE INVENTION

However, when a headlight is provided at the front surface of the canopy roof at an upper part of the operator's cab, it is feared that an exhaust pipe positioned to the front of the operator's cab may hinder the headlight from illuminating to the front. Further, with work machines, it is preferable for a substantial range of illumination to be ensured for the headlights. It is therefore feared that the headlight fitting angle may become restricted as a result of an exhaust pipe hindering illumination and the range of illumination of the headlights may therefore become limited.

An object of the present invention is therefore to provide work machine capable of ensuring a substantial range of illumination for the headlights and capable of preventing an exhaust pipe from hindering forward illumination by the headlights.

The work machine of a first aspect of the invention includes an operator's cab, an engine hood, an exhaust pipe, a first headlight, and a second headlight. The engine hood is disposed in front of the operator's cab. The exhaust pipe projects upwards from the engine hood. The first headlight and the second headlight are spaced apart in a lateral direction at a front part of the operator's cab and are disposed so that optical axes of the first and second headlights mutually intersect and the optical axes do not overlap with the exhaust pipe when viewed in a top plan view.

With this work machine, the first headlight and the second headlight are arranged so that the optical axis of the first headlight and the optical axis of the second headlight intersect. It is therefore difficult for the exhaust pipe to obstruct forward illumination by the first and second headlights even when the first and second headlights are arranged with an angle giving broad forward illumination. As a result, the work machine is capable of ensuring a substantial range of illumination for the first and second headlights and is capable of suppressing obstruction by an exhaust pipe of forward illumination by the first and second headlights.

In a work machine of a second aspect of the present invention, with a work machine of the first aspect of the invention, the exhaust pipe is positioned in front of the first headlight or the second headlight so that the exhaust pipe is positioned to overlap with the first headlight or the second headlight, or outwardly of the first headlight or the second headlight.

With this work machine, the exhaust pipe is positioned to the front or to the outside of the front of the first headlight or the second headlight. If the exhaust pipe is arranged in this manner, when forward illumination by the first and second headlights takes place, or when the first headlight or the second headlight is arranged facing to the outside so as to illuminate broadly in a lateral direction, it becomes easy for the exhaust pipe to obstruct illumination by the first headlight or the second headlight. However, with this work machine, the first and second headlights are arranged so that the optical axis of the first headlight and the optical axis of the second headlight intersect. As a result, the work machine is capable of ensuring a substantial range of illumination for the first and second headlights even when the arrangement of the exhaust pipe is such that illumination is easily hindered as described above, and is capable of preventing an exhaust pipe from obstructing forward illumination by the first and second headlights.

The work machine of a third aspect of the invention is the work machine of the first aspect of the invention, with the operator's cab further having an external shape with a width in the lateral direction tapering towards a front side of the operator's cab.

Typically, if the operator's cab is wide in a lateral direction, it is possible to easily expand the range of illumination in a lateral direction by arranging the first headlight and the second headlight so as to be spaced substantially in a lateral direction. However, when the operator's cab is narrow in a lateral direction, the positions of installation of the first and second headlights are restricted and it becomes difficult to broaden the range of illumination in a lateral direction.

With this work machine, the operator's cab further has an external shape where width in a lateral direction of the front side tapers. The width in a lateral direction of the operator's cab therefore becomes smaller and installation positions for the first and second headlights are restricted. However, with this work machine, the first and second headlights are arranged so that the optical axis of the first headlight and the optical axis of the second headlight intersect. This means that it is possible to ensure a substantial range of illumination for the first and second headlights even when the positions of installation for the first and second headlights are restricted and it is possible to suppress obstruction by the exhaust pipe of forward illumination by the first and second headlights.

With the work machine of a fourth aspect of the invention, in the work machine of the first aspect of the invention, the operator's cab has a first pillar and a second pillar extending in a vertical direction as being spaced apart in the lateral direction at the front part. The exhaust pipe is arranged so as to overlap with the first pillar and the second pillar when viewed from the rear.

With this work machine, visibility to the front from the operator's cab is therefore improved because the exhaust pipe overlaps with the first pillar or the second pillar when viewed from the rear. Further, when the exhaust pipe is arranged so as to overlap with the first pillar or the second pillar when viewed from the rear, there is the fear that the exhaust pipe will interfere with illumination from either of the first headlight or the second headlight. With this work machine, the first headlight and the second headlight are arranged so that the optical axis of the first headlight and the optical axis of the second headlight intersect. It is therefore possible to suppress interference of the exhaust pipe with forward illumination by first and second headlights.

With the work machine of a fifth aspect of the invention, in the work machine of the first aspect of the invention, work implement is disposed in front of the engine hood. The first headlight and the second headlight are then arranged so that an upper end of the work implement is illuminated with an intensity of illumination of 300 lux or more.

With this work machine, the upper end of the work implement is illuminated by the first and second headlights with an intensity of illumination of 300 lux or more. 300 lux is a sufficient intensity of illumination for performing work using the work implement. It is therefore possible to ensure a sufficient intensity of illumination for working with the work implement by illuminating the upper end of the work implement with an intensity of illumination of 300 lux or more.

With the work machine of a sixth aspect of the invention, in the work machine of the first aspect of the invention, work implement is disposed in front of the engine hood. The first headlight and the second headlight are then arranged so that at least part of a side end of the work implement is illuminated with an intensity of illumination of 300 lux or more.

With this work machine, at least part of the side end of the work implement is illuminated by the first and second headlights with an intensity of illumination of 300 lux or more. 300 lux is a sufficient intensity of illumination for performing work using the work implement. It is therefore possible to ensure a sufficient intensity of illumination for working with the work implement by illuminating at least part of the side end of the work implement with an intensity of illumination of 300 lux or more.

In the work machine of a seventh aspect of the invention, with the work machine of the first aspect of the invention, a third headlight is further disposed between the first headlight and the second headlight in the lateral direction.

With this work machine, it is possible to illuminate between space illuminated by the first headlight and space illuminated by the second headlight using the third headlight. With this work machine, it is possible to illuminate a broad range in a lateral direction using the first headlight and the second headlight, and it is possible to sufficiently illuminate to the front using the third headlight.

With the work machine of an eighth aspect of the invention, in the work machine of the seventh aspect of the invention, the third headlight is as arranged to illuminate a higher position than the first headlight and the second headlight.

With this work machine, it is therefore possible to illuminate further to the front by providing the third headlight so as to illuminate higher than the first headlight and the second headlight.

In the work machine of a ninth aspect of the invention, the work machine of any of the first to eighth aspects of the invention is further provided with a coupling member that couples the first headlight and the second headlight to the operator's cab. The coupling member includes a first positioning unit having an inclined shape corresponding to an angle of the optical axis of the first headlight, and a second positioning unit having an inclined shape corresponding to the optical axis of the second headlight.

With this work machine, the first positioning unit and the second positioning unit are provided at the coupling member. It is therefore possible to prevent the first headlight and the second headlight from being fitted at an erroneous angle.

DETAILED DESCRIPTION OF THE INVENTION

Structure

Figure 1:
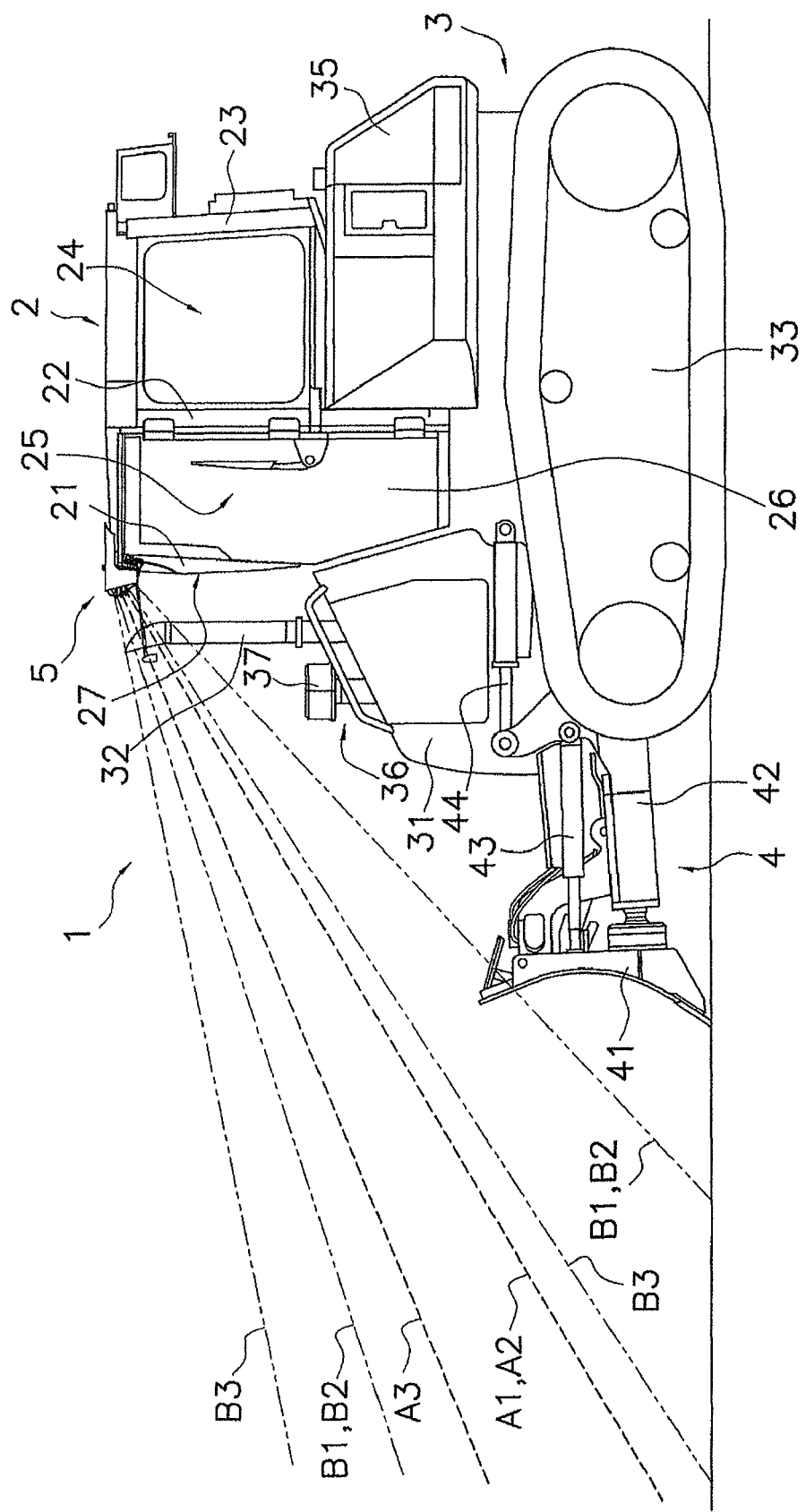
FIG. 1 is a side view of a work machine.
Figure 2:
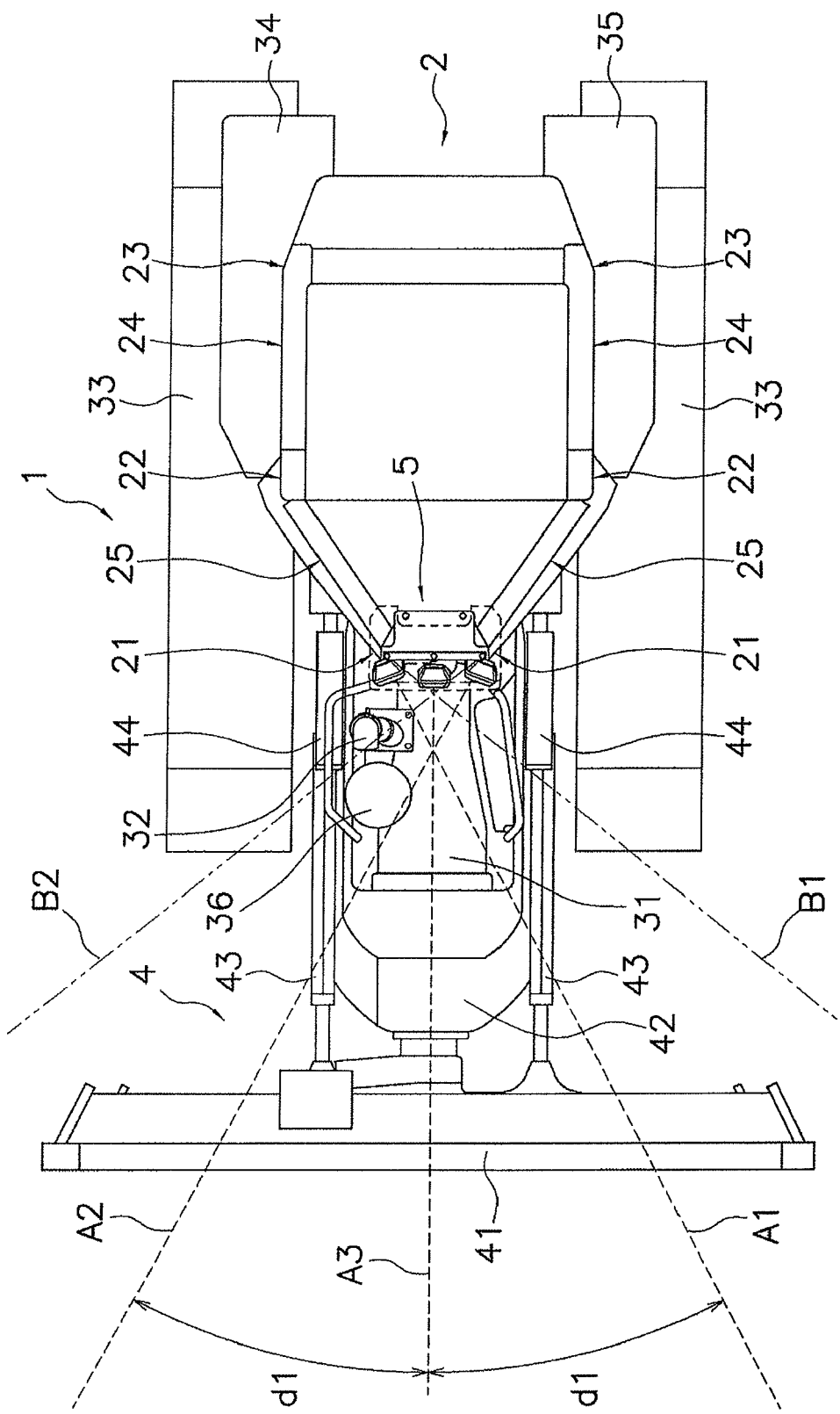
FIG. 2 is a plan view of the work machine.

A work machine 1 of a first embodiment of the present invention is shown in FIG. 1 and FIG. 2. FIG. 1 is a side view of the work machine 1, and FIG. 2 is a plan view of the work machine 1. The work machine 1 is a crawler dozer that travels due to being driven by a crawler track and carries out various operations using work implement 4 provided at a front section. The work machine 1 has an operator's cab 2, a vehicle body 3, the work implement 4, and a lighting assembly 5.

Operator's Cab 2

A seat for an operator of the work machine 1 to sit on, a lever for performing various operations, a pedal, and various instruments for various operations are installed in the operator's cab 2. The operator's cab 2 has a roll-over protection structure (ROPS) and arranged above the vehicle body 3.

The operator's cab 2 has, in order from the front side, a pair of A-pillars 21, a pair of B-pillars 22, and a pair of C-pillars 23. Each of the pillars 21 to 23 are spaced in a lateral direction and extend vertically. The pair of B-pillars 22 and the pair of C-pillars 23 are spaced at substantially the same intervals. A pair of rear side surfaces 24 connecting the B-pillars 22 and the C-pillars is arranged parallel with respect to each other. With respect to this, the pair of A-pillars 21 is spaced at smaller intervals than the pair of B-pillars 22. A pair of front part side surfaces 25 connecting the A-pillars 21 and the B-pillars 22 are disposed so that spacing in a lateral direction becomes smaller towards the front. The front part side surfaces 25 are inclined with respect to the front surface of the operator's cab 2 and connect to the front surface of the operator's cab. The operator's cab 2 has a tapered outer shape where the width in a lateral direction of the front surface side becomes smaller. An entrance/exit for the operator is provided at the front part side surface 25 and is fitted with a door 26. A front window 27 enabling the operator in the cab to see forwards is provided at the upper half of the front surface of the operator's cab 2.

Vehicle Body 3

The vehicle body 3 has a drive device (not shown) including an engine and a hydraulic oil pump, an engine hood 31, an exhaust pipe 32, a right-left travel device 33, a fuel tank module 34, a hydraulic oil tank module 35, and a main frame (not shown) that supports these.

An engine is housed within the engine hood 31. The engine hood 31 is provided to the front of the operator's cab 2. The upper surface of the engine hood 31 is inclined further downwards towards the front. A rear end part of the upper surface of the engine hood 31 connects to the lower end of the window 27 of the operator's cab 2. An opening through which an inlet of an air cleaner 36 and the exhaust pipe 32 pass is provided at an upper surface of the engine hood 31.

The exhaust pipe 32 is a pipe that discharges exhaust gas generated by the engine to outside. The exhaust pipe 32 is provided projecting upwards from an upper surface of the engine hood 31, with an upper end reaching the vicinity of the upper surface of the operator's cab 2. The exhaust pipe 32 is arranged eccentrically to the side from the center of the engine hood 31 in a lateral direction and is erected at a position overlapping with the A-pillar 21 as viewed from the rear, i.e. as viewed by the operator in the operator's cab 2. As a result, it is possible to prevent forward visibility for the operator in the operator's cab 2 from being reduced by the exhaust pipe 32. A head section 37 for a head cleaner 36 is arranged to the front of the exhaust pipe 32.

The traveling device 33 is fitted to both left and right sides of the main frame and is formed endlessly from a number of coupled plate-shaped shoes. A crawler track wrapped around a sprocket wheel and an idler tumbler spaced along a longitudinal direction of the vehicle is then made to rotate. This means that travel on uneven terrain is possible.

The fuel tank module 34 includes a fuel tank that stores fuel supplied to the engine and is fitted to one side of the rear of the operator's cab 2.

The hydraulic oil tank module 35 includes a hydraulic oil tank that stores hydraulic operating oil supplied to a transmission system and the work implement 4 system and is fitted to the other side of the rear part of the operator's cab 2.

Work Implement 4

The work implement 4 has a dozing blade 41, an arm member 42, and hydraulic cylinders 43, 44.

The dozing blade 41 is provided to the front of the engine hood 31 and is wider than the operator's cab 2 in a lateral direction. Further, when the lower end of the dozing blade 41 makes contact with the ground, the upper end of the dozing blade 41 is positioned lower than the upper surface of the engine hood 31. The upper surface of the engine hood 31 is then positioned lower than a virtual line linking an upper end of the dozing blade 41 and an upper end of the front surface of the operator's cab 2.

The arm member 42 is a member supporting the work implement 4. One end of the arm member 42 is connected to the vehicle body 3 and the other end is connected to the arm member 42.

The hydraulic cylinders 43, 44 constitute a hydraulic actuator where the dozing blade 41 is tilted in a desired direction or moved as a result of telescopic motion.

Lighting Assembly 5

Figure 3:
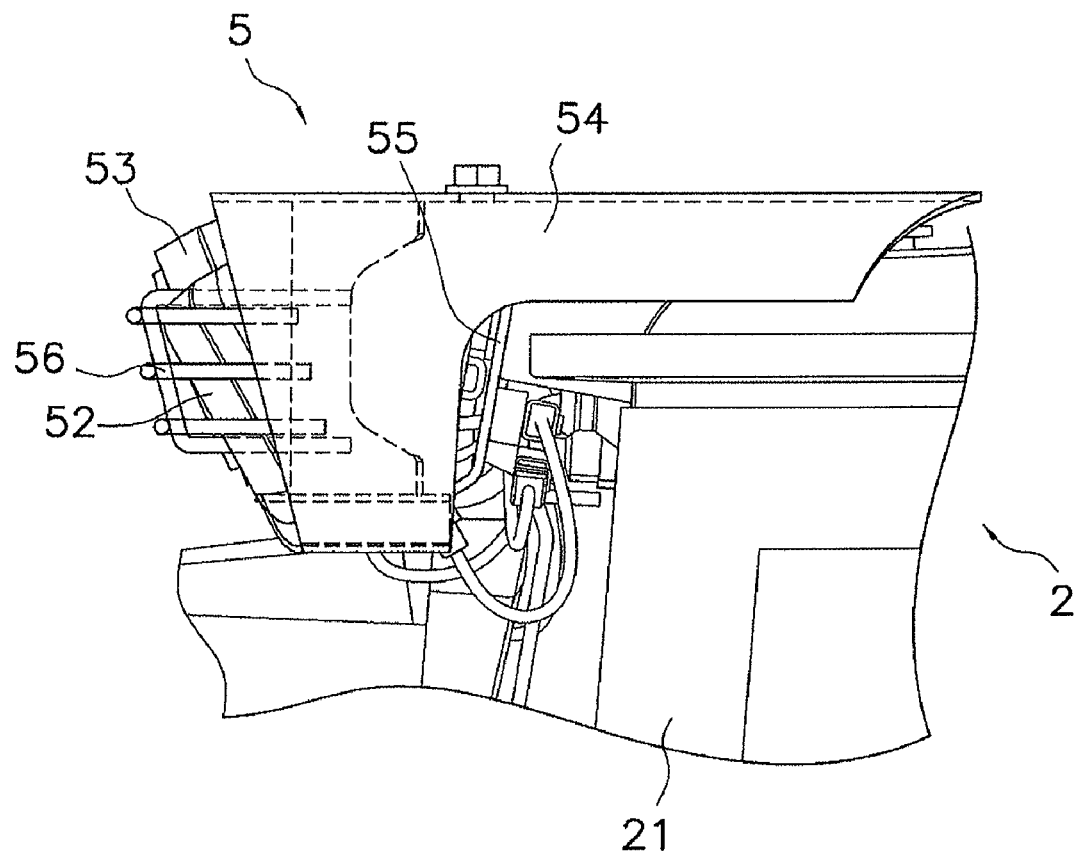
FIG. 3 is a side view of a lighting assembly.
Figure 4:
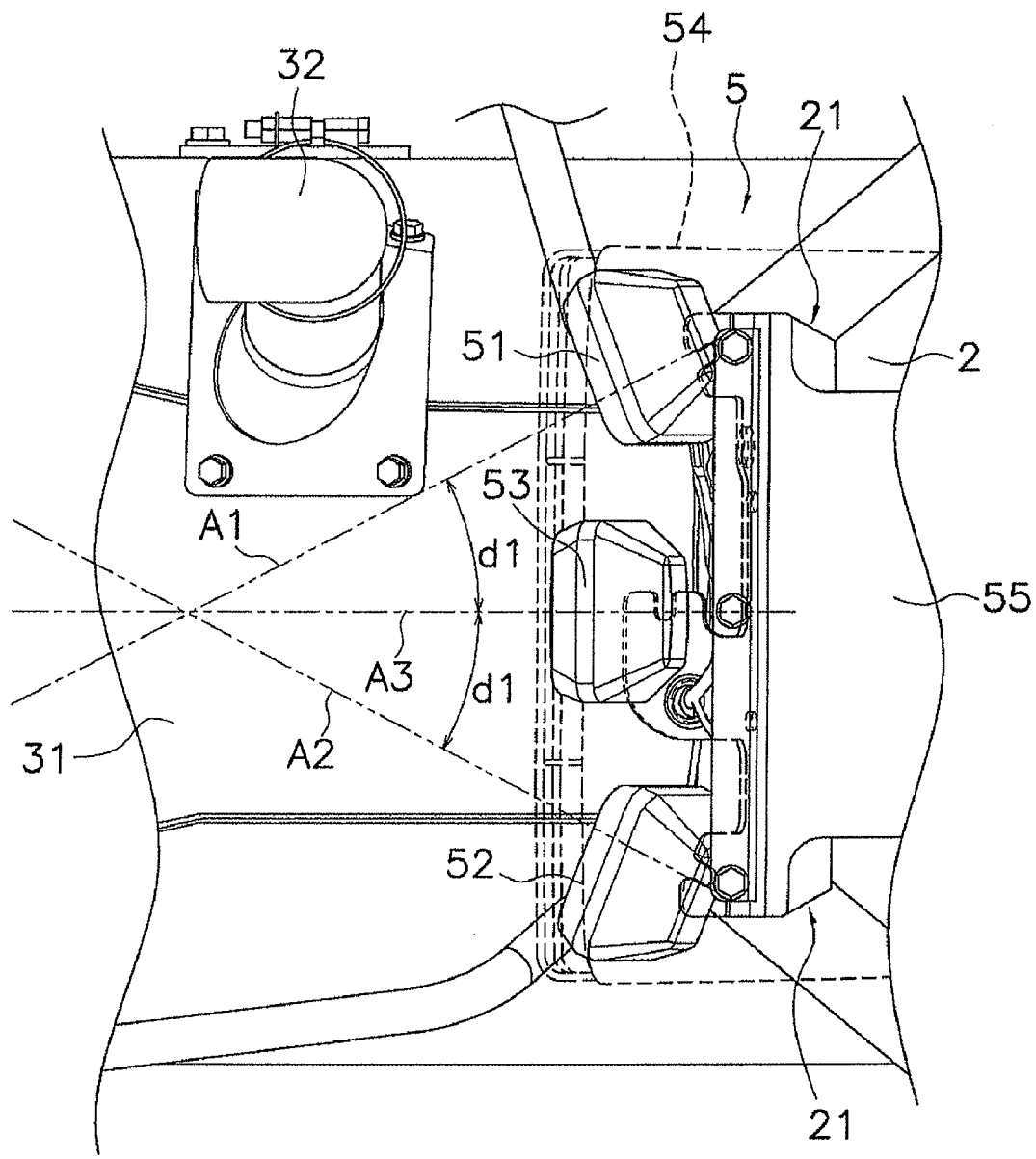
FIG. 4 is a plan view of the lighting assembly.

The lighting assembly 5 is fitted to an upper end of the front surface of the operator's cab 2 and is for illuminating to the front of the operator's cab 2. As shown in FIG. 3 and FIG. 4, the lighting assembly 5 has a first headlight 51, a second headlight 52, a third headlight 53, a headlight casing 54, and a coupling member 55. In FIG. 4, a perspective drawing is shown for ease of understanding, with the headlight casing 54 depicted using a broken line.

The first headlight 51 and the second headlight 52 are provided at the upper end of the front surface of the operator's cab 2 spaced in a lateral direction and are arranged facing the A-pillar 21 as viewed from above. Since the exhaust pipe 32 is arranged at a position overlapping with the A-pillar 21 as described above, exhaust pipe 32 is disposed at a position that overlaps with the first headlight 51 as shown in FIGS. 2 and 4. In other words, as shown in FIGS. 2 and 4, the exhaust pipe 32 and the first headlight 51 are aligned along a vertical plane parallel to a longitudinal center axis of the engine hood when the work machine is placed on the level surface as shown in FIG. 1. In this embodiment, the first headlight 51 is arranged to the right side when viewed by the operator in the operator's cab 2, and the second headlight 52 is disposed on the left side. The first headlight 51 and the second headlight 52 are disposed symmetrically. The exhaust pipe 32 described above is provided along a position to the front and slightly to the outer side of the first headlight 51. The first headlight 51 and the second headlight 52 are disposed facing slightly to the inside. As shown in FIG. 2 and FIG. 4, optical axes A1, A2 intersect with each other but do not overlap with the exhaust pipe 32. The optical axis A1 of the first headlight 51 and the optical axis A2 of the second headlight 52 intersect directly above the upper surface of the engine hood 31 as shown in FIGS. 2 and 4. This intersection point is positioned on a center line in a lateral direction of the operator's cab 2 and a center line in a lateral direction of the dozing blade 41. The first headlight 51 and the second headlight 52 are provided facing inwards at a predetermined angle d1 with respect to a direction extending directly ahead from the front surface of the operator's cab 2. In this situation, the optical axis A1 of the first headlight 51 passes through above the left half of the dozing blade 41, as shown in FIG. 2. Of the light irradiated from the first headlight 51, a boundary line B1 of an intensity of illumination of 300 lux passes through the outer side of the dozing blade 41 as viewed from above and intersects with the upper part of the dozing blade 41, as viewed from the side (refer to FIG. 1). The upper part of the left side end of the dozing blade 41 is illuminated with an intensity of illumination of 300 lux or more by the first headlight 51. Further, the optical axis A2 of the second headlight 52 passes through above the right half of the dozing blade 41. Of the light irradiated from the second headlight 52, a boundary line B2 of an intensity of illumination of 300 lux passes through the outer side of the dozing blade 41 as viewed from above and intersects with the upper part of the dozing blade 41, as viewed from the side. The upper part of the right side end of the dozing blade 41 is illuminated with an intensity of light of 300 lux or more by the second headlight 52. The predetermined angle d1 is, for example, twenty-eight degrees. However, this angle d1 is decided according to the distance between the dozing blade 41 and the first headlight 51 and second headlight 52, the gap between the first headlight 51 and the second headlight 52, and the arrangement of the exhaust pipe 32, and so on.

The third headlight 53 is provided centrally between the first headlight 51 and the second headlight 52 in a lateral direction. Thus, as shown in FIGS. 1 to 5, the first headlight 51, the second headlight 52 and the third headlight 53 are positioned to be generally level with each other when the work machine is placed on the level surface. The third headlight 53 is arranged on a center line in a lateral direction of the operator's cab 2 and is arranged so as to illuminate directly to the front when viewed from above. An optical axis A3 of the third headlight 53 overlaps with a central line in a lateral direction of the operator's cab 2 when viewed from above and passes through a center of the dozing blade 41 in a lateral direction. As shown in FIG. 2, the third headlight 53 is provided so as to illuminate higher than the first headlight 51 and the second headlight 52. The angle formed by the optical axis A3 of the third headlight 53 and the horizontal direction is smaller than the angles formed by the optical axes A1, A2 of the first headlight 51 and the second headlight 52 and the horizontal direction. A boundary line B3 of 300 lux, of the light irradiated from the third headlight 53, passes through the top of the dozing blade 41.

As shown in FIG. 3, the headlight casing 54 is a cover that covers both sides and the top of the first headlight 51, the second headlight 52, and the third headlight 53. An opening is provided at the front surface of the headlight casing 54. This enables light from the first headlight 51, the second headlight 52, and the third headlight 53 to be transmitted. A grid-shaped protective member 56 is provided at the opening of the front surface of the headlight casing 54 that protects the first headlight 51, the second headlight 52, and the third headlight 53.

Figure 5:
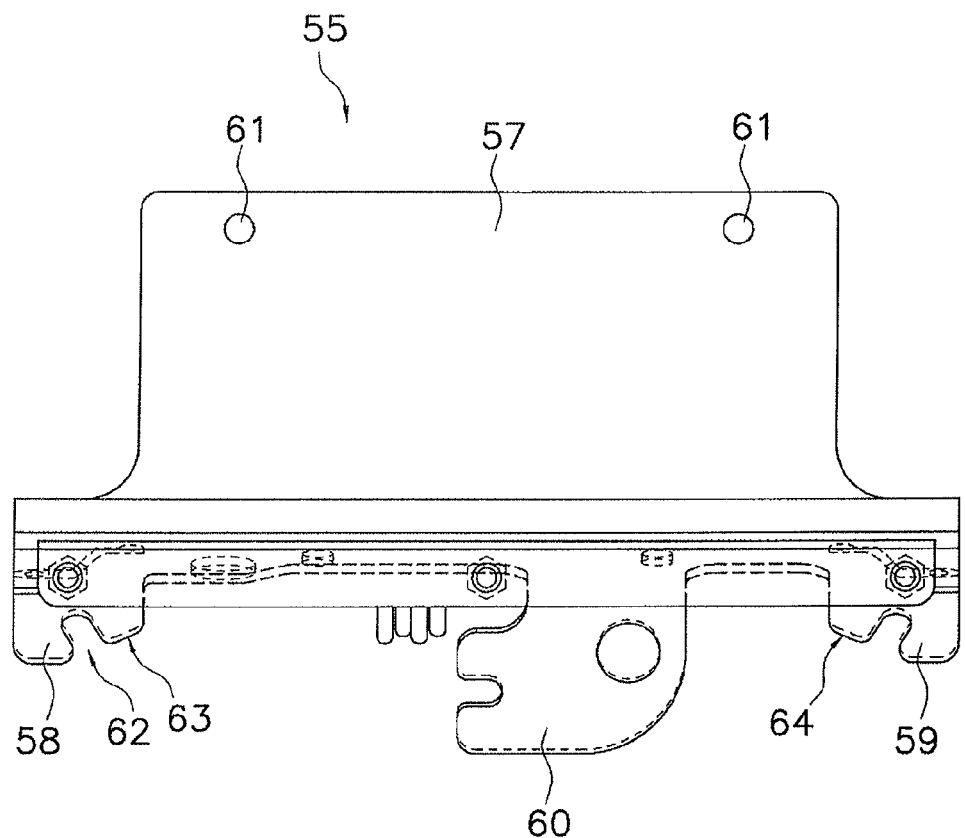
FIG. 5 is a plan view of a coupling member.
Figure 6:
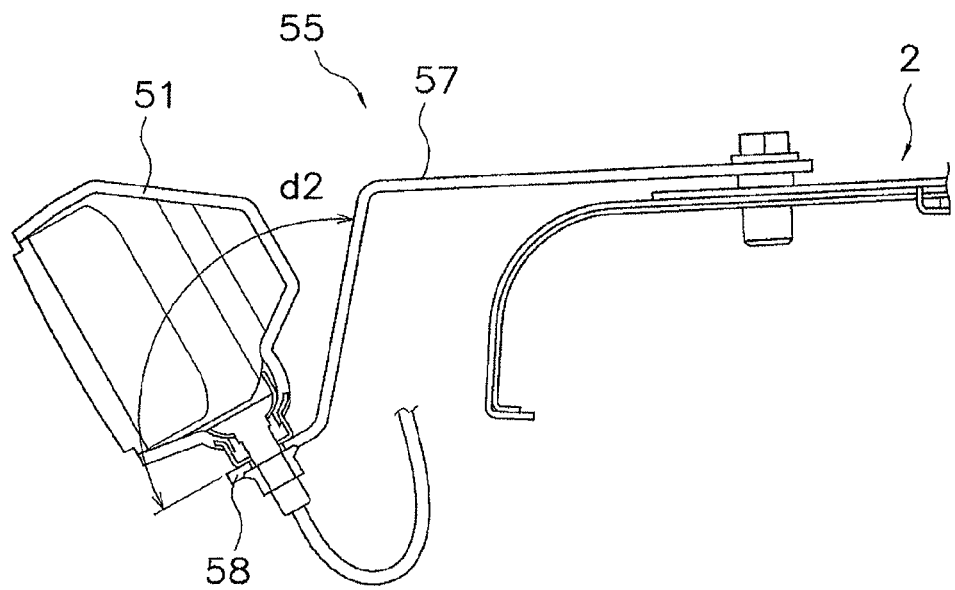
FIG. 6 is a side cross-section of the coupling member in the vicinity of a first coupling member.
Figure 7:
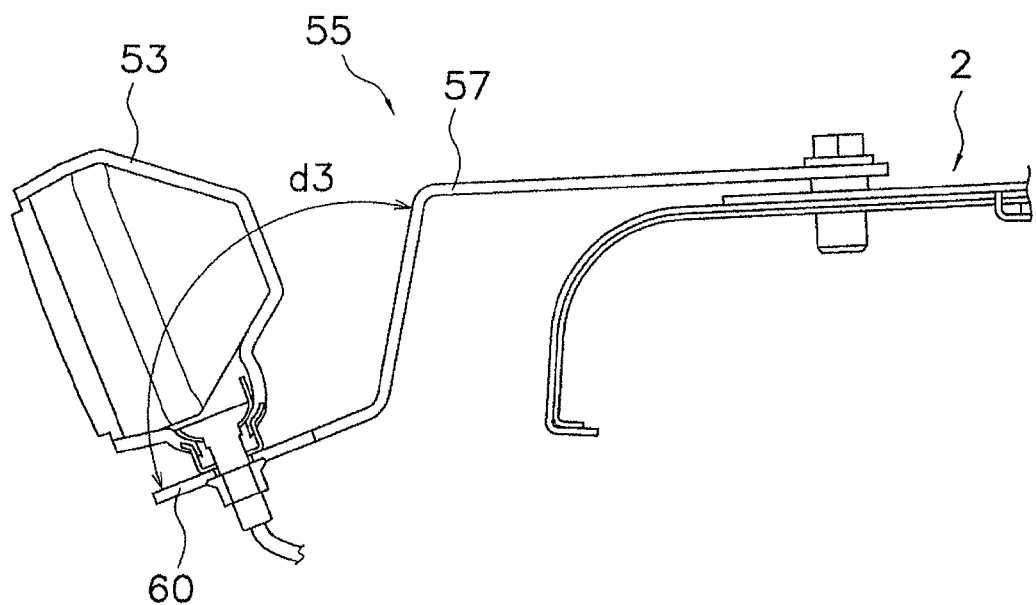
FIG. 7 is a side view of the coupling member in the vicinity of a third coupling member.

The coupling member 55 is a member for fitting the first headlight 51, the second headlight 52, and the third headlight 53 to the operator's cab 2. The coupling member 55 has a main body 57, a first coupling member 58, a second coupling member 59, and a third coupling member 60, as shown in FIG. 5 to FIG. 7. FIG. 5 is a plan view of the coupling member 55. FIG. 6 is a side cross-section of the coupling member 55 in the vicinity of the first coupling member 58 and shows the situation when fitted to the upper surface of the operator's cab 2. Further, FIG. 7 is a side cross-section of the coupling member 55 in the vicinity of the third coupling member 60 and shows the situation when fitted to the upper surface of the operator's cab 2.

The main body 57 is a plate-shaped portion bent into an L-shape when viewed from the side. A hole 61 that a bolt for fixing to the upper surface of the operator's cab 2 passes through is provided in the vicinity of the rear end of the main body 57.

The first coupling member 58, the second coupling member 59, and the third coupling member 60 are connected at the front end of the main body 57 and are the portions where the first headlight 51, the second headlight 52, and the third headlight 53 are fitted, respectively.

Figure 8:
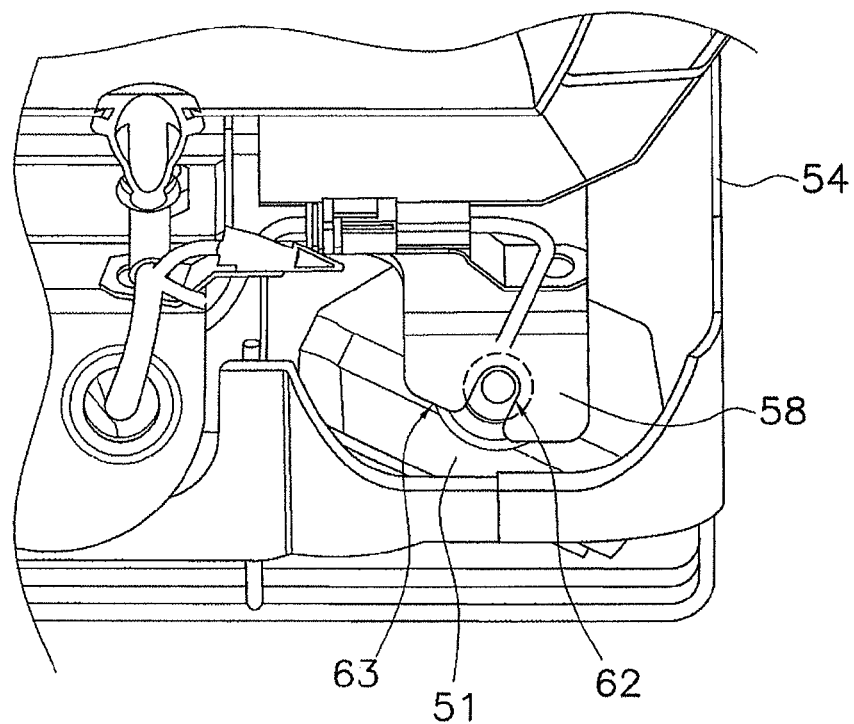
FIG. 8 is a view showing the relationship between a first positioning unit and a first headlight.

The first coupling member 58 has a shape projecting forwards from the front end of the main body 57. A notch 62 intruding to the rear is provided at the end of the first coupling member 58. This notch 62 is provided with the same angle as the angle of the optical axis A1 of the first headlight 51 with respect to a direction from front to rear when viewed from above. Further, a first positioning unit 63 having a shape inclined with respect to a lateral direction when viewed from above is provided at the end of the first coupling member 58. The angle of inclination of the first positioning unit 63 is an angle corresponding to the angle of the optical axis A1 of the first headlight 51. This angle is provided so as to be parallel with the joint for the member of the first headlight 51 fitted at this angle (refer to FIG. 8).

The second coupling member 59 has a shape that is bilaterally symmetrical with the first coupling member 58 and has a second positioning unit 64 inclined in a manner corresponding to the angle of the optical axis A2 of the second headlight 52.

The third coupling member 60 is provided between the first coupling member 58 and the second coupling member 59 at the front end of the main body 57. The third coupling member 60 has a shape extending forwards from the front end of the main body 57 and bent towards the first fitting member 58.

Further, the first coupling member 58 and the second coupling member 59 are connected so as to form a predetermined angle d2 with respect to the front end of the main body 57 (refer to FIG. 6). The third coupling member 60 is connected to the front end of the main body 57 with an angle d3 different to the angle for the first coupling member 58 and the second coupling member 59. In other words, as shown in FIGS. 5 to 7, the first coupling member 58 includes a first surface supporting the first headlight 51, the second coupling member 59 includes a second surface supporting the second headlight 52, and the third coupling member 60 includes a third surface supporting the third headlight 53. The difference between the angle d2 (FIG. 6) and the angle d3 (FIG. 7) corresponds to the difference in the angles for the optical axis A1 of the first headlight 51 and the optical axis A2 of the second headlight 52 and the angle for the optical axis A3 of the third headlight 53.

(1) With this work machine 1, the optical axis A1 of the first headlight 51 and the optical axis A2 of the second headlight 52 are arranged so as to intersect. It is therefore possible to illuminate while easily avoiding obstructions to the front. It is also possible to ensure that the optical axis A1 of the first headlight 51 and the optical axis A2 of the second headlight 52 do not overlap with the exhaust pipe 32. The optical axis A3 of the third headlight 53 does not overlap with the exhaust pipe 32. It is therefore possible to prevent the exhaust pipe 32 from obstructing forward illumination by the lighting assembly 5 and it is possible to ensure a substantial range of illumination by the lighting assembly 5.

Further, the optical axes A1 to A3 of the lighting assembly 5 do not overlap with the exhaust pipe 32. It is therefore possible to suppress the reflection of light irradiated by the headlights 51 to 53 towards the operator's cab 2 by the exhaust pipe 32. As a result, it is possible to reduce the amount of reflected light entering the field of vision of the operator, and visibility can be improved.

(2) With the work machine 1, the third headlight 53 is provided between the first headlight 51 and the second headlight 52. The third headlight 53 is then arranged facing further upwards than the first headlight 51 and the second headlight 52. It is therefore possible to increase visibility in a lateral direction using the first headlight 51 and the second headlight 52 and it is possible to improve forward visibility using the third headlight 53.

(3) With this work machine 1, the first positioning unit 63 and the second positioning unit 64 are provided at the coupling member 55. When the first headlight 51 and the second headlight 52 are fitted, it is possible to easily fit the first headlight 51 and the second headlight 52 at an appropriate fitting angle. Further, it is possible to easily return to an appropriate fitting angle when the fitting angle for the first headlight 51 or the second headlight 52 is changed.

Other Embodiments (A) In the above embodiments, the work machine is taken to be a crawler dozer. However, it is also possible to apply the present invention to other work machines where there is an obstacle such as the exhaust pipe 32 that obstruct illumination between the work implement 4 and the lighting assembly 5.

(B) In the above embodiment, the operator's cab 2 has a tapered shape. When the operator's cab 2 is shaped in this manner, the present invention is more effective because the installation position of the first headlight 51 and the second headlight 52 is restricted. However, it is also possible for the present invention to be more effective when the width of the operator's cab 2 itself is small regardless of the external shape of the operator's cab 2 because the installation position of the first headlight 51 and the second headlight 52 is then restricted.

(C) In the above embodiment, an example is given of an intensity of illumination of 300 lux as a reference for the range of illumination of the first headlight 51, the second headlight 52, and the third headlight 53 but it is also possible to use a different intensity of illumination as a reference providing that an intensity of illumination required for operation is ensured.

(D) In the above embodiment, the first headlight 51 is positioned by fitting the first headlight 51 so that the first positioning unit 63 becomes parallel with the joint for the member of the first headlight 51 but positioning where the first positioning unit 63 comes into contact with the first headlight 51 is also possible.

(E) In the above embodiments, the first to third headlights 51 to 53 are arranged to the front of the operator's cab 2 but the technological concept of the present invention also includes situations where the headlights are arranged on the front end of the upper surface of the operator's cab 2.

The present invention can ensure a large range of illumination for headlights and can prevent an exhaust pipe from obstructing forward illumination by headlights. The present invention is therefore useful as a work machine.

The invention claimed is:

1. A work machine comprising:
an operator's cab;
an engine hood disposed in front of the operator's cab;
an exhaust pipe projecting upwards from the engine hood;
a first headlight and a second headlight spaced apart in a lateral direction of the work machine at a front part of the operator's cab to illuminate a front side of the work machine, the first and second headlights being disposed so that optical axes of the first and second headlights mutually intersect at a position directly above the engine hood on a longitudinal center axis of the engine hood and the position laterally away from the exhaust pipe when viewed in a top plan view;
a third headlight disposed between the first headlight and the second headlight in the lateral direction to illuminate the front side of the work machine; and
a coupling member mounted to the operator's cab to fix the first, second and third headlights to the operator's cab,
the exhaust pipe and the first headlight being aligned along a vertical plane parallel to the longitudinal center axis of the engine hood when the work machine is placed on a level surface,
the third headlight being arranged with respect to the first and second headlights so that an acute angle formed between a horizontal plane and an optical axis of the third headlight is smaller than acute angles formed between the horizontal plane and the optical axes of the first headlight and the second headlight when the work machine is placed on the level surface,
the coupling member including a first surface supporting the first headlight, a second surface supporting the second headlight, and a third surface supporting the third headlight,
a difference between an inclination angle of the first surface with respect to the horizontal plane and an inclination angle of the third surface with respect to the horizontal plane being substantially equal to a difference between the acute angle formed between the optical axis of the first headlight and the horizontal plane and the acute angle formed between the optical axis of the third headlight and the horizontal plane, and a difference between an inclination angle of the second surface with respect to the horizontal plane and the inclination angle of the third surface with respect to the horizontal plane being equal to a difference between the acute angle formed between the optical axis of the second headlight and the horizontal plane and the acute angle formed between the optical axis of the third headlight and the horizontal plane.

2. The work machine according to claim 1, wherein
the operator's cab has an external shape with a width in the lateral direction tapering towards a front side of the operator's cab.

3. The work machine according to claim 1, wherein
the operator's cab has a first pillar and a second pillar spaced apart in the lateral direction at the front part of the operator's cab, the first and second pillars extending in a vertical direction, and
the exhaust pipe is disposed so as to overlap with the first pillar when viewed from the rear.

4. The work machine according to claim 1, further comprising
work implement disposed in front of the engine hood,
the first headlight and the second headlight being positioned so that an upper end of the work implement is illuminated with an intensity of illumination of equal to or greater than 300 lux.

5. The work machine according to claim 1, further comprising
work implement disposed in front of the engine hood,
the first headlight and the second headlight being positioned so that at least part of a side end of the work implement is illuminated with an intensity of illumination of equal to or greater than 300 lux.

6. The work machine according to claim 1, wherein
the third headlight is arranged with respect to the first and second headlights so that the optical axis of the third headlight is positioned higher than the optical axes of the first headlight and the second headlight as viewed from the lateral side of the work machine.

7. The work machine according to claim 1, wherein
the inclination angle of the first surface with respect to the horizontal plane corresponds to an angle of the optical axis of the first headlight with respect to the horizontal plane, and the inclination angle of the second surface with respect to the horizontal plane corresponds to the optical axis of the second headlight with respect to the horizontal plane.

8. The work machine according to claim 1, wherein
the first, second and third headlights are positioned to be generally level with each other when the work machine is placed on the level surface.

9. The work machine according to claim 1, further comprising
a headlight casing coupled to the front part of the operator's cab with the first, second and third headlights being housed in the headlight casing.

* * * * *